(12) United States Patent
Liang

(10) Patent No.: US 9,738,061 B2
(45) Date of Patent: Aug. 22, 2017

(54) HEAT TRANSFER DEVICE AND METHOD OF MAKING THE SAME

(71) Applicant: HonMounTech Co., Ltd., Taipei (TW)

(72) Inventor: Yi-Fan Liang, Taipei (TW)

(73) Assignee: HONMOUNTECH CO., LTD., Taipei (TW)

( * ) Notice: Subject to any disclaimer, the term of this patent is extended or adjusted under 35 U.S.C. 154(b) by 0 days.

(21) Appl. No.: 15/044,601

(22) Filed: Feb. 16, 2016

(65) Prior Publication Data

US 2016/0238331 A1    Aug. 18, 2016

(30) Foreign Application Priority Data

Feb. 17, 2015    (TW) .............................. 104105609 A

(51) Int. Cl.
| | |
|---|---|
| *B32B 37/00* | (2006.01) |
| *B32B 37/24* | (2006.01) |
| *F28F 21/02* | (2006.01) |
| *F28F 21/04* | (2006.01) |
| *F28F 21/08* | (2006.01) |
| *B32B 5/16* | (2006.01) |
| *B32B 33/00* | (2006.01) |
| *B32B 5/00* | (2006.01) |
| *B32B 37/12* | (2006.01) |
| *B32B 37/18* | (2006.01) |

(52) U.S. Cl.
CPC ................ *B32B 37/24* (2013.01); *B32B 5/00* (2013.01); *B32B 5/16* (2013.01); *B32B 33/00* (2013.01); *F28F 21/02* (2013.01); *F28F 21/04* (2013.01); *F28F 21/084* (2013.01); *F28F 21/086* (2013.01); *B32B 37/12* (2013.01); *B32B 37/18* (2013.01); *B32B 2307/302* (2013.01); *B32B 2309/12* (2013.01); *B32B 2310/0454* (2013.01); *B32B 2313/04* (2013.01)

(58) Field of Classification Search
CPC . B32B 37/24; B32B 2037/243; B29C 66/022; B29C 66/0222; B29C 66/72323; F28F 21/02
USPC .......................................... 156/276; 427/348
See application file for complete search history.

(56) References Cited

U.S. PATENT DOCUMENTS

2014/0287239 A1*  9/2014  Scurati ................ B29C 65/4855
                                                                    428/408

* cited by examiner

*Primary Examiner* — John Goff
(74) *Attorney, Agent, or Firm* — Morrison & Foerster, LLP

(57) ABSTRACT

A heat transfer device includes a first and second substrate, and a heat transfer layer. The first substrate includes a first plate and a first adhesive layer that is formed on the first plate. The second substrate includes a second plate and a second adhesive layer that is formed on the second plate. The heat transfer layer is sandwiched between the first adhesive and second adhesive layers, and includes a plurality of carbon flakes that is made from one of graphene or graphite. The carbon flakes lies on the first adhesive layer with partial overlap of the carbon flakes.

11 Claims, 6 Drawing Sheets

HEAT TRANSFER DEVICE AND METHOD OF MAKING THE SAME

This application claims priority of Taiwanese Application No. 104105609, filed on Feb. 17, 2015.

FIELD

The disclosure relates to a heat transfer device and a method of making the same, more particularly to a heat transfer device with a plurality of carbon flakes and a method of making the same.

BACKGROUND

In recent years, electrical devices tend to be miniaturized, and heat generation and heat dissipation of the electrical devices become a topic of concern. Thus, materials with relatively high thermal conductivity, e.g., Ag, Cu, and graphite, have been extensively used in the electrical devices. Among the materials, graphite, which contains a plurality of graphene layers including carbon atoms arranged in a 2-dimentional honeycomb lattice, has a thermal conductivity greater than that of metal. Therefore, graphite is broadly used to make a thermal conductor of an electrical device.

A conventional method of producing a thermal conductor containing graphite sheets includes: treating the graphite sheets with chemicals to improve the purity and density of the graphite sheets; compressing the treated graphite sheets under a pressure greater than 30 Mpa so as to interconnect the graphite sheets; and heating the compressed graphite sheets at a temperature between 1800° C. and 3000° C. for several hours so as to form the thermal conductor. However, the aforesaid method is time- and energy-consuming, thereby resulting in a relatively high manufacturing cost.

SUMMARY

Therefore, an object of the disclosure is to provide a heat transfer device that can alleviate the drawback of the prior arts.

According to the disclosure, the heat transfer device includes a first substrate, a second substrate, and a heat transfer layer.

The first substrate includes a first plate and a first adhesive layer that is formed on the first plate.

The second substrate includes a second plate and a second adhesive layer that is formed on the second plate.

The heat transfer layer is sandwiched between the first and second adhesive layers, and includes a plurality of carbon flakes that are made from a material selected from the group consisting of graphene, graphite, and the combination thereof. Each of the carbon flakes lies on the first adhesive layer with partial overlap of the carbon flakes.

Another object of the disclosure is to provide a method of making the heat transfer device.

According to the disclosure, the method includes: heating a first substrate that includes a first plate and a first adhesive layer so as to soften the first adhesive layer; disposing on the first adhesive layer a plurality of carbon flakes that are made from a material selected from the group consisting of graphene, graphite, and the combination thereof; blowing a hot air flow to the carbon flakes in a direction that is parallel to the first substrate in such a manner that each of the carbon flakes lies on the first adhesive layer with partial overlap of the carbon flakes so as to form a heat transfer layer; and disposing on the adhesive layer a second substrate that includes a second plate and a second adhesive layer, in such a manner that the heat transfer layer is sandwiched between the first and second adhesive layers.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
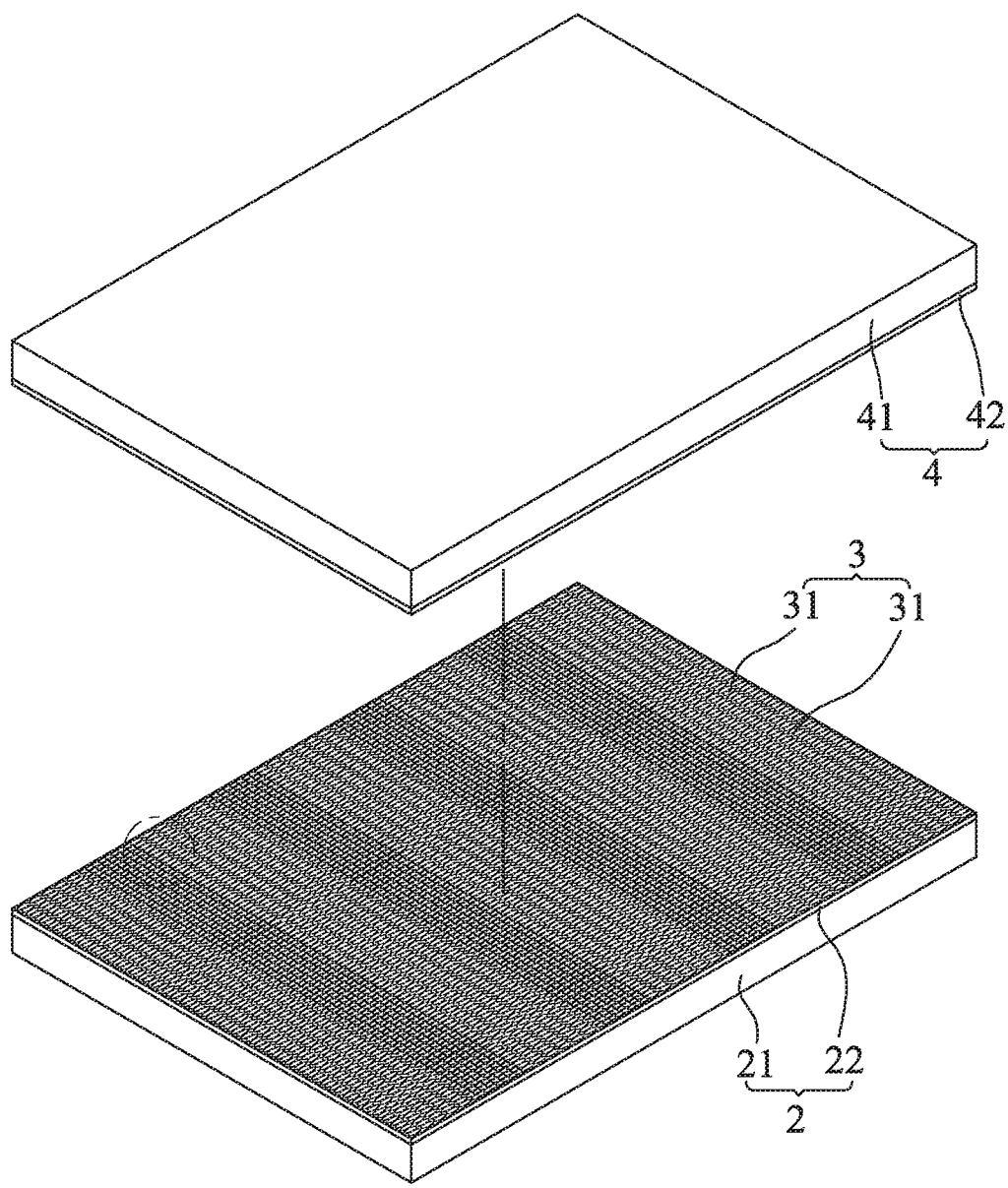
FIG. 1 is a partly exploded perspective view illustrating a first embodiment of a heat transfer device according to the disclosure.

Before the disclosure is described in greater detail, it should be noted that like elements are denoted by the same reference numerals throughout the disclosure.

Figure 2:
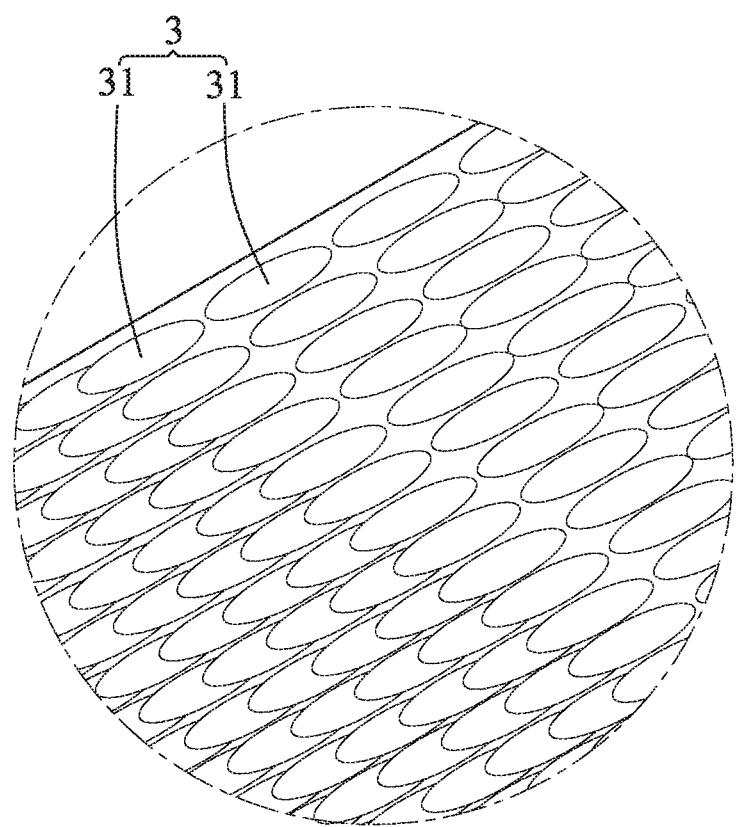
FIG. 2 is an enlarge view of an circle portion shown in FIG. 1.

Referring to FIGS. 1 and 2, a first embodiment of a heat transfer device according to this disclosure includes a first substrate 2, a second substrate 4, and a heat transfer layer 3.

The first substrate 2 includes a first plate 21 and a first adhesive layer 22 that is formed on the first plate 21.

The second substrate 4 includes a second plate 41 and a second adhesive layer 42 that is formed on the second plate 41.

The heat transfer layer 3 is sandwiched between the first and the second adhesive layers 22, 42, and includes a plurality of carbon flakes 31 that are made from a material selected from the group consisting of graphene, graphite, and the combination thereof.

Each of the carbon flakes 31 lies, as opposed to standing, on the first adhesive layer 221 with partial overlap of the carbon flakes 31. In certain embodiments, apart of the carbon flakes 31 overlap in a fish scale-like manner. In one embodiment, the carbon flakes 31 are graphite flakes. Each of the graphite flakes 31 is composed of less than 100 graphene layers, and has a thickness less than 10 μm, a length less than 80 μm, and a width less than 50 μm.

In general, graphite is a layered structure and includes a plurality of carbon layers that are stacked upon each other. Each of the carbon layers has a plurality of carbon atoms that are arranged in a honeycomb lattice. Thus, each of the carbon atoms of each of the carbon layers is connected to three adjacent ones to form the hexagonal lattice in an X-Y plane, so that graphite exhibits greater electric conductivity and greater thermal conductivity in the X-Y plane than that in a Z axis.

In this embodiment, the first adhesive layer 22 is supported by the first plate 21, and the second adhesive layer 42 is supported by the second plate 41. The first and second plates 21, 41 are individually made from a transparent material or an opaque material. The first and second adhesive layers 22, 42 are individually made from epoxy, acrylic, polyimide, etc.

Figure 3:
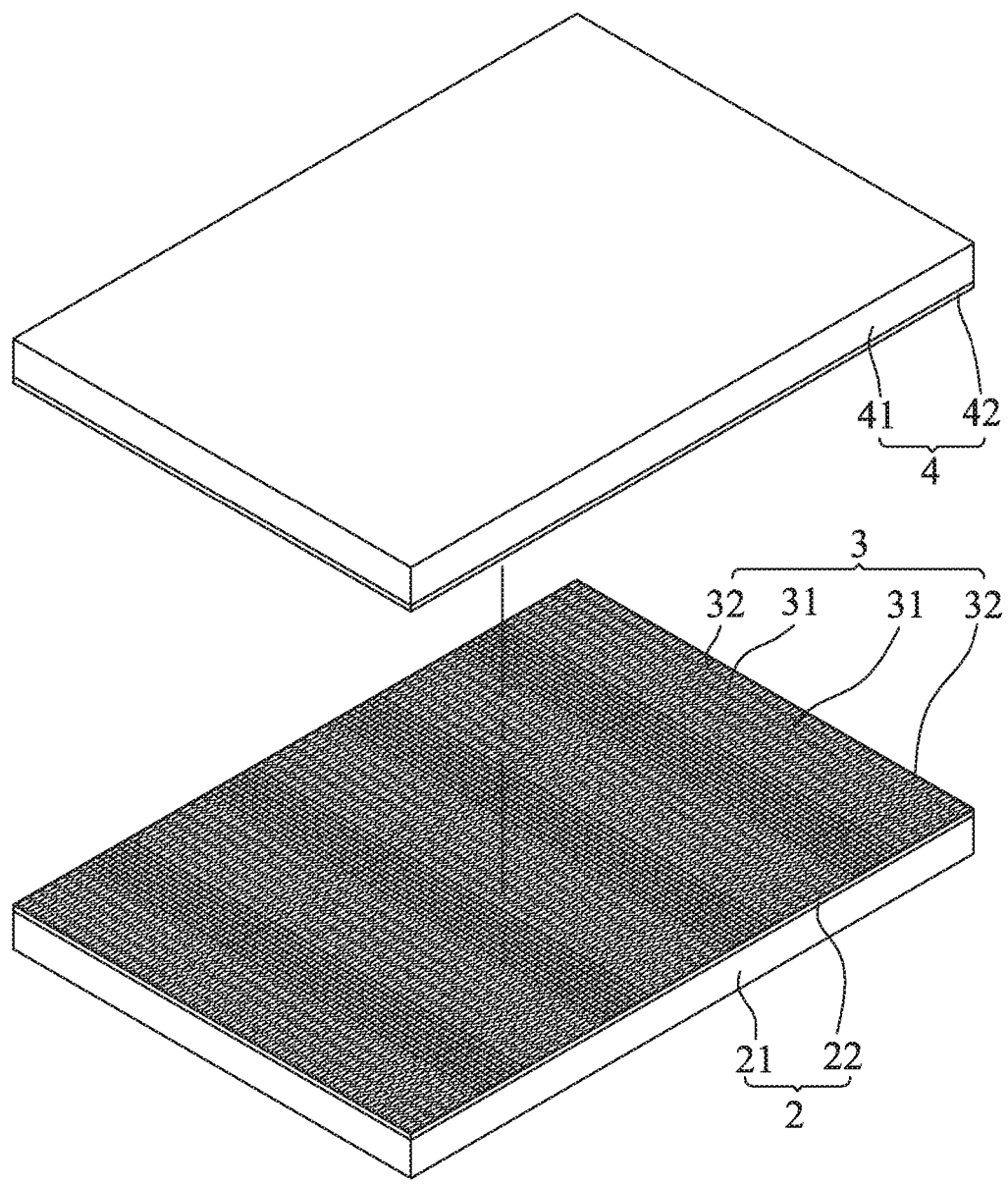
FIG. 3 is a partly exploded perspective view illustrating a second embodiment of a heat transfer device according to the disclosure.

Referring to FIG. 3, a second embodiment of the heat transfer device according to this disclosure is similar to the first embodiment except that the heat transfer layer 3 may further include a plurality of heat radiating particles 32 that are disposed on the first adhesive layer 22 and the carbon flakes 31, so as to improve thermal conductivity of the heat transfer layer 3. The heat radiating particles 32 are made from a material selected from the group consisting of carbon nanocapsule, boron nitride, silicon carbide, aluminum nitride, aluminum oxide, titanium dioxide, and combinations thereof.

Figure 4:
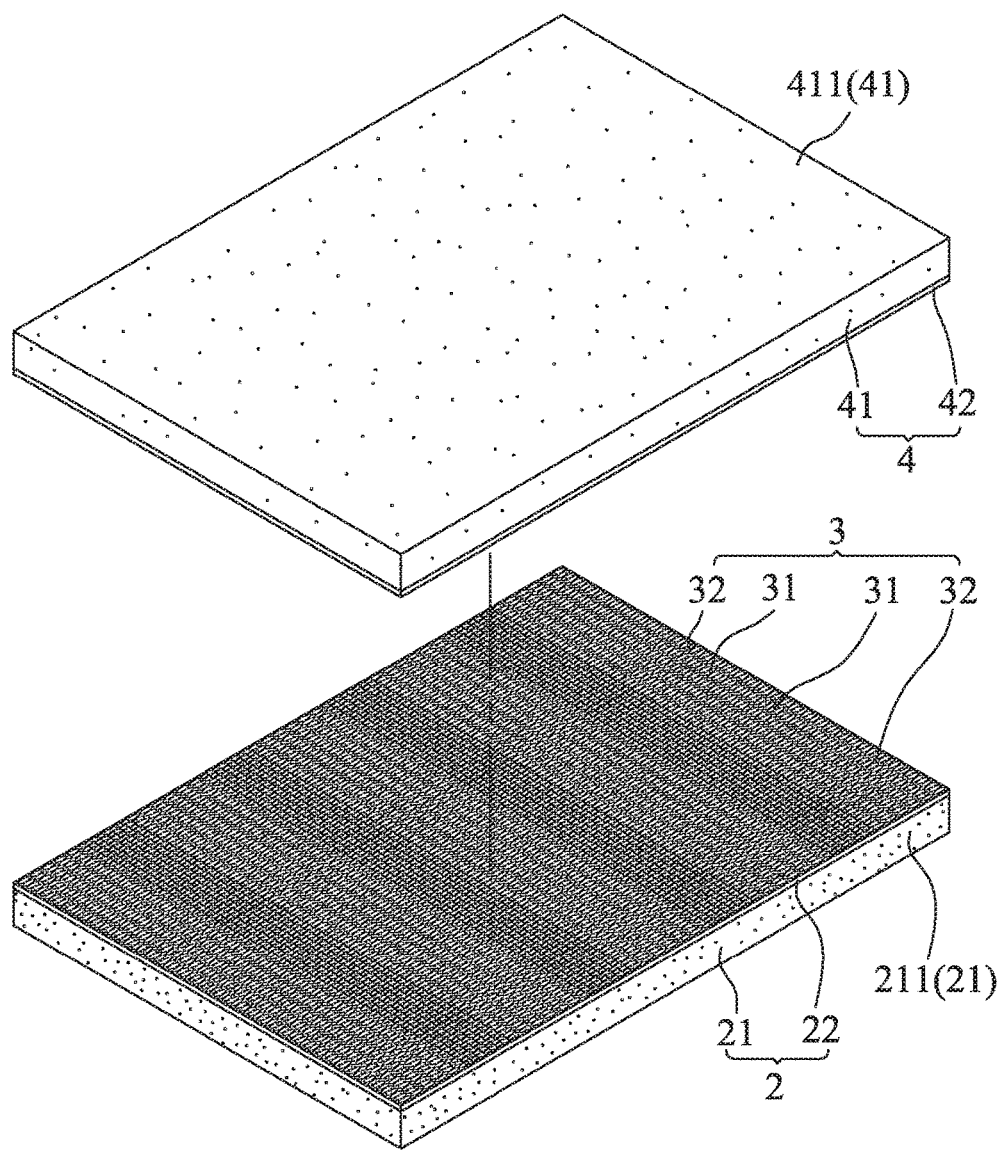
FIG. 4 is a partly exploded perspective view illustrating a third embodiment of a heat transfer device according to the disclosure, in which a first substrate and a second substrate include a plurality of heat radiating particles.

In certain embodiment, the first substrates 2 may further includes a plurality of heat radiating particles dispersed in at least one of the first plate 21 or the first adhesive layer (22). Similarly, the second substrates 4 may further includes a plurality of heat radiating particles dispersed in at least one of the second plate 41 or the second adhesive layer 42. To be specific, since the first and second adhesive layers 22, 42 is made of a material with inferior thermal conductivity, the heat radiating particles may be added to improve the thermal conductivity of the heat transfer device. Similarly, when the first and second plates 21, are made from polymers with inferior thermal conductivity, the heat radiating particles 211, 411 are preferably added therein. In a third embodiment of the heat transfer device of this disclosure, the heat radiating particles are added in the first and second plates 21, 41 (see FIG. 4). In certain embodiments, the heat radiating particles are added in all of the first plate 21, the first adhesive layer 22, the second plate 41, and the second adhesive layer 42. The heat radiating particles are made from a material selected from the group consisting of carbon nanocapsule, boron nitride, silicon carbide, aluminum nitride, aluminum oxide, titanium dioxide, and combinations thereof.

Figure 5:
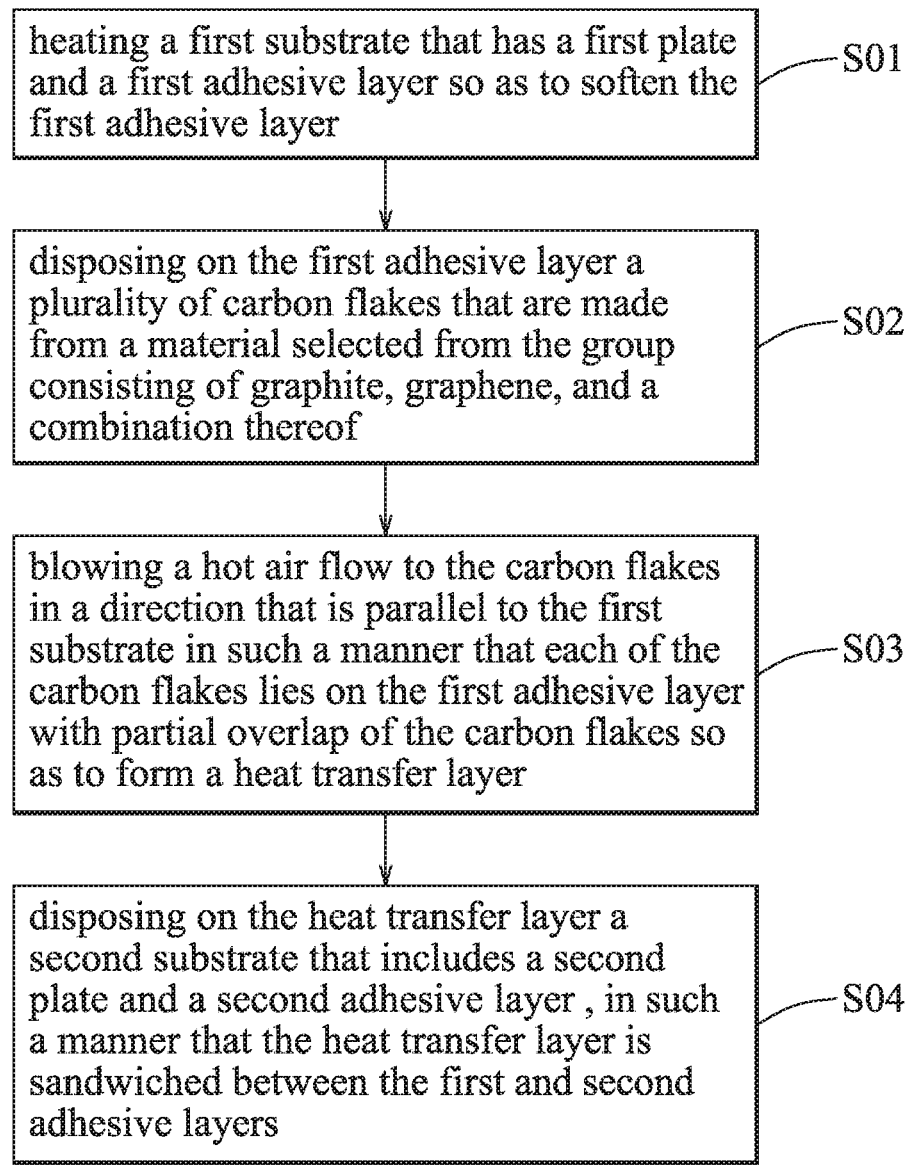
FIG. 5 is a flowchart illustrating a method of making the first embodiment of a heat transfer device according to the disclosure.
Figure 6:
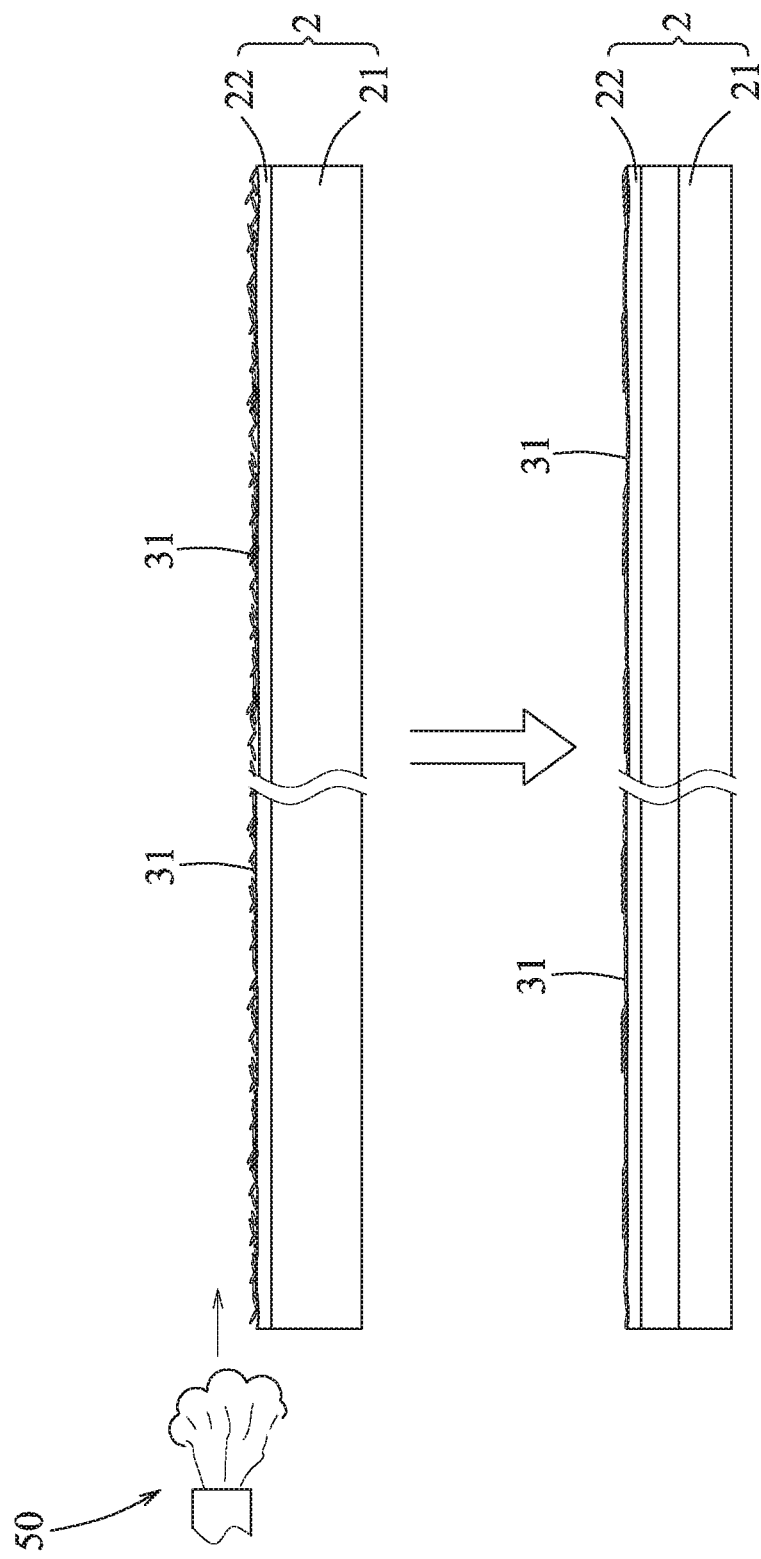
FIG. 6 is a schematic side view illustrating step S03 of the method shown in FIG. 5.

Referring to FIGS. 1, 2 and 5, a method of making the first embodiment of the heat transfer device according to this disclosure includes steps of S01 to S04.

In step S01, the first substrate 2 that has the first plate 21 and the first adhesive layer 22 is heated so as to soften the first adhesive layer 22. The first adhesive layer 22 is in a semi-fluid condition.

In step S02, the carbon flakes 31 are disposed on the softened first adhesive layer 22. In this step, a part of the carbon flakes 31 lie on the softened first adhesive layer 22, and a part of the carbon flakes 31 stand on the soften first adhesive layer 21.

Referring FIGS. 1, 2, 5, and 6, in step S03, a hot air flow 50 is blown to the carbon flakes 31 in a direction (X) that is parallel to the first substrate 31 in such a manner that each of the carbon flakes 31 lies, as opposed to standing, on the first adhesive layer 22, with partial overlap of the carbon flakes 31 so as to form the heat transfer layer 3. In certain embodiments, the temperature of the hot air flow 50 is not greater than 500° C.

In certain embodiment, a part of the carbon flakes 31 overlap in the fish scale-like manner after step S03, so that the thermal conductivity of the heat transfer layer 3 can be improved.

In step S04, the second substrate 4 that includes the second plate 41 and the second adhesive layer 42 is disposed on the heat transfer layer 3, in such a manner that the heat transfer layer 3 is sandwiched between the first and second adhesive layers 21, 41 to form the first embodiment of the heat transfer device according to this disclosure.

In detail, the second substrate 4 is disposed on the heat transfer layer 3 using a compression technique under a pressing pressure not greater than 20 MPa. The compression technique is well known to those skilled in the art, further details thereof are not provided herein for the sake of brevity.

With the first and second adhesive layers 21, 41, the method may be conducted under a relatively low compression pressure and a relatively low temperature so as to prevent high manufacture cost and squandering of energy. Furthermore, the carbon flakes 31 lie on the first adhesive layer, and the part of the carbon flakes 31 overlap in a fish scale-like manner through hot air flow 50, so that the thermal conductivity of the heat transfer device according to this disclosure can be improved.

The method of making the second embodiment of the heat transfer device according to this disclosure is similar to that of making the first embodiment except that before step S03, the heat radiating particles 32 are spread on the first adhesive layer 22. The carbon flakes 31 and the heat radiating particles 32 constitute the heat transfer layer 3. Alternatively, spreading the heat radiating particles 32 may conducted after step S03 and before step S04. The heat radiating particles 32 may in gaps among the carbon flakes 31, so that the thermal conductivity of the heat transfer layer 3 can be improved.

To sum up, in this disclosure, each of the carbon flakes 31 lies on its face on the first adhesive layers 21 with partial overlap of the carbon flakes 31, the thermal conductivity of the heat transfer layer 3 is improved. The heat radiating particles 32 may further improve the thermal conductivity of the heat transfer device. With the first and second adhesive layers 22, 42, the heat transfer device according to this disclosure may be made under a relatively low compression pressure and a relatively low temperature as compared to the prior art.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding various inventive aspects.

While the disclosure has been described in connection with what is considered the exemplary embodiment(s), it is understood that this disclosure is not limited to the disclosed embodiment but is intended to cover various arrangements included within the spirit and scope of the broadest interpretation so as to encompass all such modifications and equivalent arrangements.

What is claimed is:

1. A method of making a heat transfer device, comprising:
   heating a first substrate that has a first plate and a first adhesive layer so as to soften the first adhesive layer;
   disposing on the first adhesive layer a plurality of carbon flakes that are made from a material selected from the group consisting of graphite, graphene, and the combination thereof;
   blowing a hot air flow to the carbon flakes in a direction that is parallel to the first substrate in such a manner that each of the carbon flakes lies on the first adhesive layer with partial overlap of the carbon flakes so as to forma heat transfer layer; and disposing on the heat transfer layer a second substrate that includes a second plate and a second adhesive layer, in such a manner that the heat transfer layer is sandwiched between the first and second adhesive layers.

2. The method of claim 1, wherein a part of the carbon flakes overlap in a fish scale-like manner.

3. The method of claim 1, wherein the second substrate is disposed on the heat transfer layer using a compression technique under a pressing pressure not greater than 20 MPa.

4. The method of claim 1, further comprising, before the blowing step, spreading a plurality of heat radiating particles on the first adhesive layer, the carbon flakes and the heat radiating particles constitute the heat transfer layer.

5. The method of claim 1, further comprising, after the blowing step and before the step of disposing the second substrate, spreading a plurality of heat radiating particles on the first adhesive layer, the carbon flakes and the heat radiating particles constitute the heat transfer layer.

6. The method of claim 4, wherein the heat radiating particles are made from a material selected from the group consisting of carbon nanocapsule, boron nitride, silicon carbide, aluminum nitride, aluminum oxide, titanium dioxide, and combinations thereof.

7. The method of claim 1, wherein the first substrate further includes a plurality of heat radiating particles dispersed in at least one of the first plate or the first adhesive layer.

8. The method of claim 7, wherein the heat radiating particles are made from a material selected from the group consisting of carbon nanocapsule, boron nitride, silicon carbide, aluminum nitride, aluminum oxide, titanium dioxide, and combinations thereof.

9. The method of claim 1, wherein the second substrate further includes a plurality of heat radiating particles dispersed in at least one of the second plate or the second adhesive layer.

10. The method of claim 9, wherein the heat radiating particles are made from a material selected from the group consisting of carbon nancapsule, boron nitride, silicon carbide, aluminum nitride, aluminum oxide, titanium dioxide, and combinations thereof.

11. The method of claim 1, wherein the temperature of the hot air flow is not greater than 500° C.

* * * * *